(12) United States Patent
Glazik et al.

(10) Patent No.: US 7,124,564 B2
(45) Date of Patent: Oct. 24, 2006

(54) HARVESTER REEL TINE REPAIR

(75) Inventors: Steven G. Glazik, Paxton, IL (US); Gary B. Glazik, Paxton, IL (US)

(73) Assignee: Plastic Designs, Inc., Paxton, IL (US)

( * ) Notice: Subject to any disclaimer, the term of this patent is extended or adjusted under 35 U.S.C. 154(b) by 0 days.

(21) Appl. No.: 10/696,901

(22) Filed: Oct. 30, 2003

(65) Prior Publication Data

US 2005/0091955 A1    May 5, 2005

(51) Int. Cl.
*A01D 57/02* (2006.01)
(52) U.S. Cl. .......................... 56/220; 56/400
(58) Field of Classification Search .............. 56/219, 56/220, 227, 400, 12.4
See application file for complete search history.

(56) References Cited

U.S. PATENT DOCUMENTS

| | | | | |
|---|---|---|---|---|
| 22,235 A | * | 12/1858 | Hadcock et al. | 56/400 |
| 1,256,809 A | * | 2/1918 | Koch | 56/400 |
| 1,471,989 A | * | 10/1923 | Weis | 56/400.04 |
| 1,699,947 A | * | 1/1929 | Bell et al. | 56/400.17 |
| 2,944,847 A | * | 7/1960 | Chadowski | 403/301 |
| 3,003,149 A | * | 10/1961 | Grashow | 343/715 |
| 3,066,470 A | * | 12/1962 | Johnston | 56/400 |
| 3,261,153 A | * | 7/1966 | Johnston | 56/400 |
| 3,468,109 A | * | 9/1969 | Reimer | 56/220 |
| 3,616,631 A | * | 11/1971 | Quam | 56/400 |
| 4,156,340 A | | 5/1979 | Colgan et al. | |
| 4,459,797 A | | 7/1984 | Gessel et al. | |
| 4,520,620 A | | 6/1985 | Gessel et al. | |
| 4,706,448 A | | 11/1987 | Gessel et al. | |
| 4,776,155 A | * | 10/1988 | Fox et al. | 56/220 |
| 4,882,899 A | | 11/1989 | Jasper et al. | |
| 6,199,357 B1 | | 3/2001 | Bloom | |
| 6,397,573 B1 | * | 6/2002 | Majkrzak | 56/220 |

* cited by examiner

*Primary Examiner*—Meredith C. Petravick
(74) *Attorney, Agent, or Firm*—Cook, Alex, McFarron, Manzo, Cummings & Mehler, Ltd.

(57) ABSTRACT

Repair of a broken finger of a harvester reel pickup tine is accomplished by positioning a repair finger having a cavity over the broken finger stub so that the broken finger stub of the harvester reel pickup tine is received in the cavity of the repair finger, and the repair finger is then fastened adjacent one end to the pickup tine when the broken finger stub is in the cavity.

35 Claims, 2 Drawing Sheets

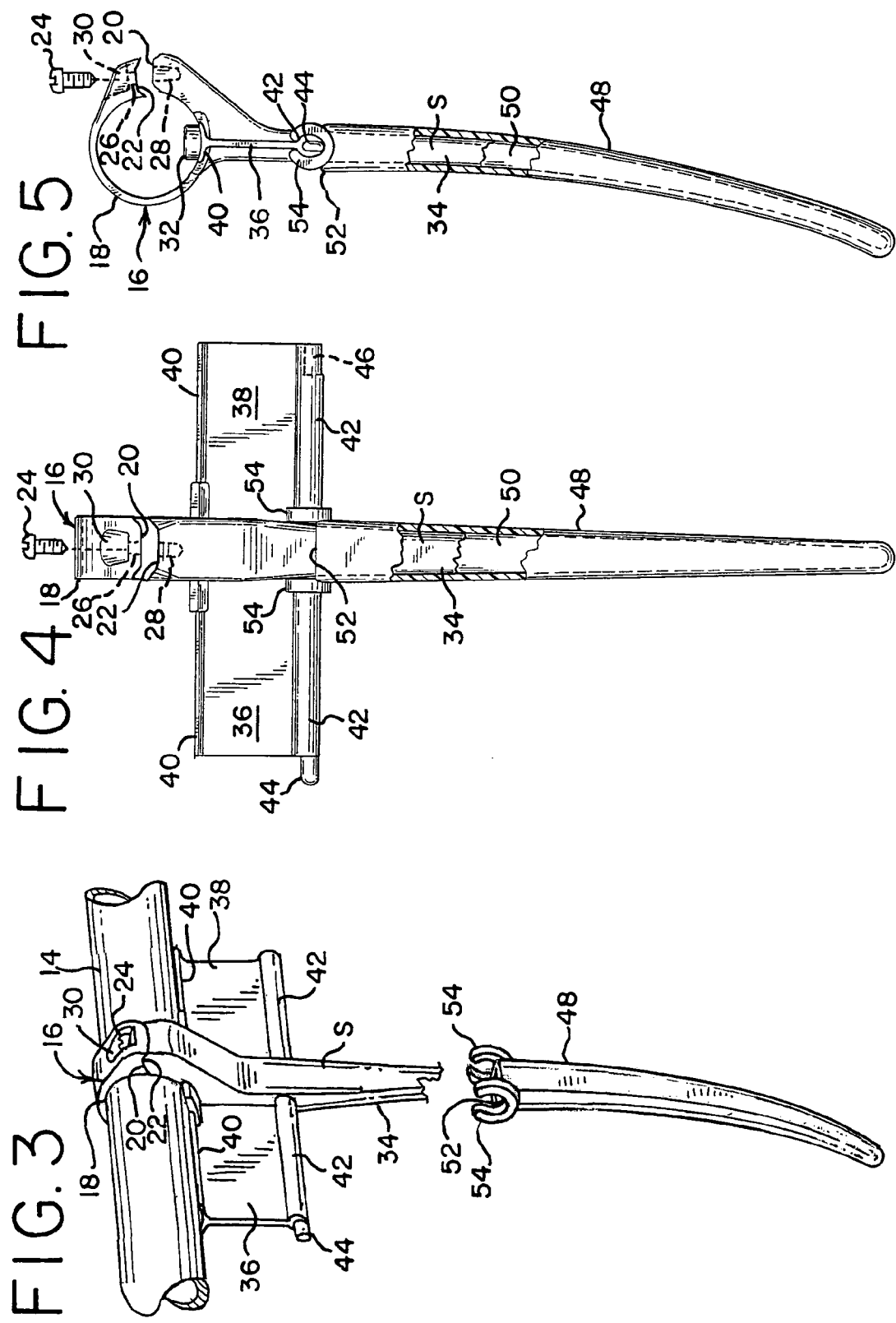

HARVESTER REEL TINE REPAIR

BACKGROUND AND SUMMARY OF THE INVENTION

The present invention is directed to the repair of broken harvester reel pickup tine fingers.

Combines used in the harvesting for example of wheat, soy beans and small grains typically have a rotating cylindrical harvester reel at the forward leading end of the combine to sweep the crop which is to be harvested into the combine apparatus. These reels include a plurality of spaced horizontally extending support shafts which rotate with the reel and which have a plurality of pickup tines attached in side by side relationship to each other along the length of the support shafts. These pickup tines are typically molded in one piece integral construction of a durable plastic, such as for example, nylon, acetal or homopolypropylene, and include a clamp for clamping the pickup tine to the support shaft and an elongate curved finger of approximately 7½ inches long which extends from the clamp so as to sweep the crop to be harvested into the harvester reel and combine.

In view of the rather severe environment in which these pickup tines operate and their functional purpose, the fingers of the tines are subject to breakage due to contact with rocks and other objects as well as the crop which itself is being harvested all of which are encountered while the rotating harvester reel is moving over the field being harvested. Various approaches have been employed to minimize to the extent possible such breakage. However, breakage of the fingers will inevitably occur.

Once a sufficient number of tine fingers have been broken to impair the efficient operation of the harvester reel, it is necessary to stop the harvester and manually unscrew and remove the broken pickup tines from the support shaft and replace them with new tines. This obviously is wasteful of both time and effort, requires the use of a tool, and maximizes the time which the combine is out of service.

The present invention substantially reduces such waste of time, effort and downtime by permitting a broken tine finger to be easily and rapidly repaired without the need for tools or the need to remove the pickup tine from the support shaft and replace it with a new tine. In the present invention a new hollow finger is simply slipped over the remaining portion of the broken finger and is fastened in place to the existing tine without the need to remove the existing tine with its broken finger from the support shaft or the need for tools to do so. Moreover, if the hollow finger itself subsequently becomes broken, it may easily be replaced simply by removing it from the preexisting pickup tine and replacing the hollow finger with a new hollow finger.

In one principal aspect of the present invention, a finger for receiving a finger of a harvester reel pickup tine comprises an elongate hollow finger having a cavity therein opening to at least one end of the finger and extending over at least a portion of the length of the finger, the cavity being constructed and arranged to receive at least a portion of a finger of the harvester reel pickup tine therein, and at least one fastener adjacent the one end for fastening the hollow finger over the portion of the finger of the pickup tine when the portion is in the cavity.

In another principal aspect of the present invention, a harvester reel pickup tine comprises a clamp for clamping the pickup tine to a support shaft of a harvester reel, and a first elongate finger extending from adjacent the clamp. A second elongate hollow finger having a cavity therein opens to at least one end of the second hollow finger and extends over at least a portion of the length of the second finger, the cavity being constructed and arranged to receive at least a portion of the first finger therein. At least one fastener adjacent the one end fastens the second hollow finger over the portion of the first finger when the portion is in the cavity.

In still another principal aspect of the present invention, the hollow finger is curved.

In still another principal aspect of the present invention, the hollow finger is smaller in cross section toward the end opposite said one end.

In still another principal aspect of the present invention, the shape of the elongate hollow finger is a substantial replicate of the finger of the harvester reel pickup tine.

In still another principal aspect of the present invention, the cavity of the hollow finger is constructed and arranged to receive a remaining broken portion of a broken finger of the pickup tine to repair the broken finger.

In still another principal aspect of the present invention, the fastener is constructed and arranged to frictionally engage the pickup tine to fasten the one end of the hollow finger to the pickup tine.

In still another principal aspect of the present invention, the fastener comprises a split ring, and preferably a pair of split rings.

In still another principal aspect of the present invention, the pickup tine includes at least one wing extending from the first finger at an angle thereto, and the clamp, first elongate finger and wing are formed in integral one-piece relationship.

In still another principal aspect of the present invention, a method of repairing a broken finger of a harvester reel pickup tine comprises positioning an elongate hollow finger having a cavity therein opening to at least one end of the hollow finger and extending over at least a portion of the length of the hollow finger so that at least a portion of a remaining portion of the broken finger extends into the cavity; and fastening the elongate hollow finger over the remaining portion of the broken finger when the portion extends into the cavity.

In still another principal aspect of the present invention, in the method the elongate hollow finger is frictionally fastened to the pickup tine.

In still another principal aspect of the present invention, in the method the elongate hollow finger is fastened to a wing of the pickup tine.

In still another principal aspect of the present invention, in the method the elongate hollow finger is snapped onto the pickup tine.

In still another principal aspect of the present invention, in the method substantially all of the remaining portion of the broken finger is positioned in the cavity.

In still another principal aspect of the present invention, in the method the repair is accomplished without removing the pickup tine from the harvester reel.

These and other objects, features and advantages of the present invention will be more clearly understood through a consideration of the following detailed description.

BRIEF DESCRIPTION OF THE DRAWINGS

In the course of this description reference will be frequently made to the attached drawings in which:

FIG. 3 is a partially broken perspective view of the broken pickup tine substantially as shown in FIG. 2 and with a hollow repair finger in accordance with the invention in the process of being installed;

FIG. 4 is a partially broken front elevation view of the broken pickup tine with the hollow repair finger in place; and FIG. 5 is a partially broken side elevation view of the broken pickup tine as shown in FIG. 4 with the hollow repair finger in place.

DESCRIPTION OF THE PREFERRED EMBODIMENT

Figure 1:
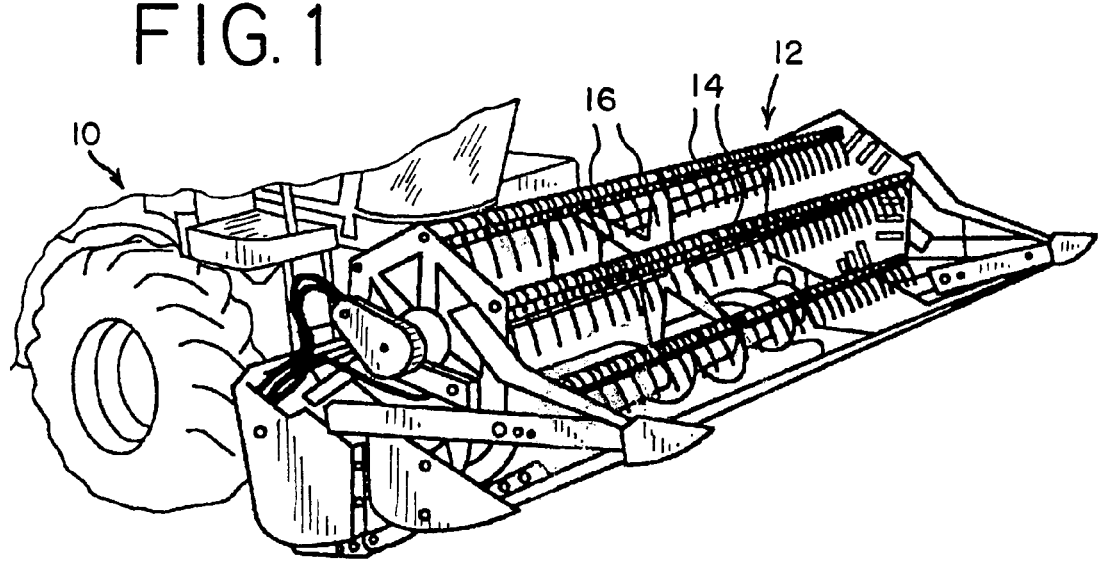
FIG. 1 is a perspective view of a harvester reel shown mounted on the front of a harvester combine, and which incorporates the pickup tines in accordance with the present invention.

A combine 10 for harvesting a crop is partially shown in FIG. 1 having a harvester reel 12 at the forward end thereof for picking up the crop to be harvested for processing by the combine. Such crops typically include wheat, soybeans and other small grains. The harvester reel 12 is comprised of a plurality of horziontally extending spaced apart support shafts 14 which rotate as the reel 12 is rotated. Each of the support shafts 14 has a plurality of pickup tines 16 spaced at approximately equal distances from each other along the length of the support shaft 14 as best seen in FIGS. 1 and 2.

Each of the pickup tines 16 comprises a clamp 18 at one end which is preferably formed by a split ring which may be opened by flexing to present a pair of jaws 20 and 22 as seen in FIGS. 4 and 5 which may be further flexed to separate from each other to permit passage of the clamp 18 onto and around the support shaft 14. Once the clamp 18 has been positioned on the support shaft 14, the jaws 20 and 22 may be drawn together by the threading of a screw 24 through a hole 26 in the jaw 20 and into a threaded hole 28 in the jaw 22 to draw the split rings into clamping arrangement with the support shaft 14, as best seen in FIGS. 2 and 3. The clamp 18 is also preferably recessed at 30 to accommodate and protect the head of the screw 24 in use.

The clamp 18 of the pickup tine 16 also preferably includes an upwardly extending projection 32, as best seen in FIG. 5, which fits into an opening (not shown) in the support shaft 14 to ensure that the pickup tine 16 does not rotate relative to the support shaft 14 when in use.

Figure 2:
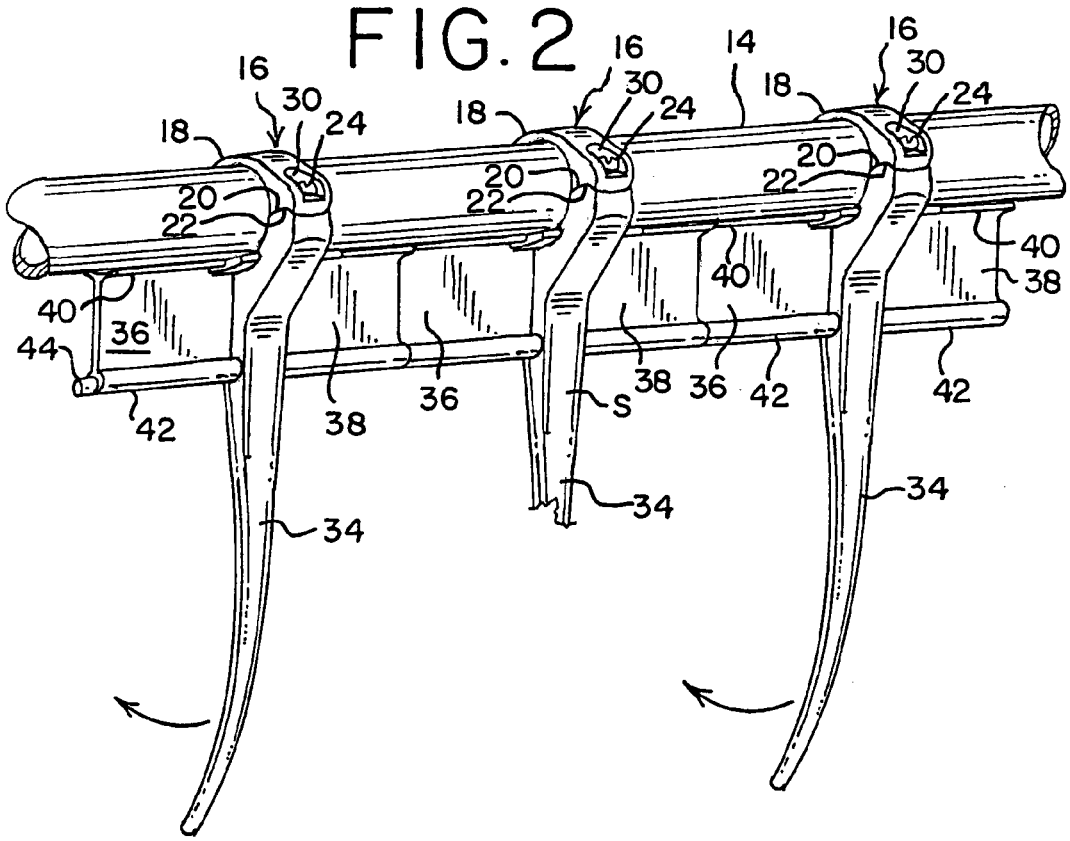
FIG. 2 is a broken perspective enlarged view of one of the support shafts of the harvester reel substantially as shown in FIG. 1, and upon which three pickup tines are mounted, one of which has been broken.

The pickup tine 16 also includes an elongate curved finger 34 which extends downwardly from the clamp 18 to produce the crop gathering and pickup effect for which the harvester reel is provided as the fingers are rotated with the reel as shown by the arrows in FIG. 2. The finger 34 is typically solid in cross section. The length of the finger 34 is typically between about 7 and 8 inches. It will be appreciated that the length of the finger may vary without departing from the principles of the invention.

The pickup tine 16 may also include one or more wings 36, 38 which extend at an angle to the finger 34 and in a direction generally parallel to the support shaft 14. Wings 36, 38 also preferably include stiffeners 40, 42 which extend along the edges of the wings in order to strengthen the wings 36, 38. As shown in the drawings, the upper stiffener 40 is formed in a generally concave shape to accommodate the curvature of the support shaft 14, and the lower stiffener 42 is generally cylindrical in shape. It will be appreciated, however, that the stiffeners 40 and 42 may assume different shapes without departing from the principles of the invention. The stiffener 42 at one side of the pickup tine 16 may also include a projection 44 which fits upwardly into a downwardly facing slot 46 in the other wing of the next adjacent pickup tine as seen in FIGS. 3 and 4 to interlock adjacent pickup tines together along the length of the support shaft 14.

The entire pickup tine 16 including its clamp 18, finger 34 and wings 36, 38 may be formed in one-piece integral form by molding from a suitable material, such as for example, nylon, acetal or homopolypropylene.

The pickup tine 16 thus far described is conventional and known in the art. The difficulty with such pickup tines is that during use the fingers 34 frequently break somewhere along their elongate length and typically intermediate the ends of the finger 34 to result in a stub S. As shown in FIGS. 2–5, this remaining finger stub S is generally too short to serve any substantial function in the gathering and pickup of the crop to be harvested. When enough of the tine fingers 34 have been broken, the combine 10 and its harvester reel 12 must be stopped, and the pickup tines 16 which have broken fingers 34 must be manually removed and replaced by a new pickup tine 16 in order to restore the effectiveness of the harvester reel 12. This necessitates the use of a tool to unscrew the screw 24, removal of the clamp 18 from the support shaft 14 together with its wings 36, 38, the repositioning of the clamp 18 and wings 36, 38 of a new pickup tine 16 with an unbroken finger 34, and manipulation of the screw 24 to clamp the new unbroken pickup tine 16 to the support shaft 14. Obviously, this replacement procedure is both time consuming and labor intensive and can result in considerable combine downtime.

In the present invention the pickup tine 16 which has broken its finger 34 may be rapidly and easily repaired without the need for tools, or the need to remove the pickup tine 16 from the support shaft 14 and replace it with a new unbroken pickup tine.

In the present invention an elongate curved hollow repair finger 48 is provided which is of the same general shape and size as the original pickup tine finger 34, and which preferably is formed of the same material, but may be formed of a different material. The hollow repair finger 48 is hollow because it includes a cavity 50 which extends over at least a portion of the length of the repair finger 48, and which is constructed and arranged to receive the remaining stub S of the broken finger 34, as seen in FIGS. 3–5. If desired, the cavity 50 may be sized and shaped to receive the entire finger 34 of an unbroken tine. The cavity 50 also includes an opening 52 at its top end to receive substantially the entire length of whatever the length of pickup tine is to be inserted into the cavity 50.

In the preferred embodiment of the invention, a pair of fastener split rings 54 straddle the opening 52 and frictionally engage the stiffener 42 by snap fit when the repair finger 48 has been finally positioned on the pickup tine 16 to fasten the repair finger 48 to the pickup tine 16. Although the remaining finger stub S may be too short to efficiently function in the crop gathering for which it was originally intended, it is typically of a sufficient length to ensure a firm fixation and support of the hollow repair finger 48 to the pickup tine 16 when it is positioned in the cavity 50.

Although the original tine finger 34 and the repair finger 48 are disclosed as tapering to a smaller cross sectional dimension toward their distal ends, it will be appreciated that they may be of unchanging, flaring or increasing cross sectional dimension over their length without departing from the present invention. Whatever their cross sectional shape or dimension over their length, it is generally preferred that the shape of the original tine finger is substantially replicated by the repair finger to the extent possible.

If in future use the hollow repair finger 48 itself becomes broken, all that need be done is to disengage it from the pickup tine 16 by unsnapping and removing the split rings 54 from the stiffeners 42, and replacing the broken repair finger with a new unbroken repair finger.

It will be understood that the preferred embodiment of the present invention which has been described is merely illustrative of the principles of the present invention. Modifications may be made by those skilled in the art without departing from the true spirt and scope of the invention.

We claim:

1. A finger for receiving an elongate harvester reel pickup tine finger of substantial length and which is curved over a substantial portion of that length comprising:
    an elongate hollow finger having an elongate cavity therein opening to at least one end of said hollow finger, said cavity being curved in the direction of its elongation and extending over at least a portion of the length of said hollow finger, said curved, elongate cavity having a size and shape to receive at least a substantial portion of the elongate harvester reel pickup tine finger therein which is curved over a substantial portion of its length; and
    at least one fastener adjacent said one end of said hollow finger for fastening said hollow finger over the portion of the pickup tine finger when said portion is in said cavity.

2. The finger of claim 1, wherein said hollow finger is curved.

3. The finger of claim 1, wherein said hollow finger is smaller in cross section opposite said one end.

4. The finger of claim 1, wherein the shape of said elongate hollow finger is a substantial replicate of the harvester reel pickup tine finger.

5. The finger of claim 1, wherein said cavity of said hollow finger has a size and shape to receive a substantial portion of a remaining curved broken portion of a broken pickup tine finger to repair the broken finger.

6. The finger of claim 1, wherein said fastener fastens said one end of said hollow finger to the pickup tine.

7. The finger of claim 1, wherein said fastener is constructed and arranged to frictionally engage the pickup tine to fasten said one end of said hollow finger to the pickup tine.

8. The finger of claim 1, wherein said fastener comprises a split ring.

9. The finger of claim 8, wherein said fastener comprises a pair of spaced split rings.

10. The finger of claim 1, wherein said cavity of said hollow finger is constructed and arranged to receive a remaining broken portion of a broken pickup tine finger to repair the broken finger; and said fastener comprises a pair of spaced split rings which are constructed and arranged to frictionally engage the pickup tine to fasten said one end of said hollow finger to the pickup tine.

11. The finger of claim 1, wherein said elongate cavity is closed in the direction of its elongation and over said at least a portion of the length of said hollow finger.

12. The finger of claim 1, wherein said elongate cavity is closed at the end of said hollow finger opposite said one end.

13. A harvester reel pickup tine comprising:
    a clamp for clamping the pickup tine to a support shaft of a harvester reel;
    a first elongate finger extending from adjacent said clamp;
    a second elongate hollow finger having an elongate cavity therein opening to at least one end of said second hollow finger, said cavity being curved in the direction of its elongation and extending over at least a portion of the length of said second finger, said cavity being constructed and arranged to receive at least a portion of said first finger therein; and
    at least one fastener adjacent said one end for fastening said second hollow finger over said portion of said first finger when said portion is in said cavity.

14. The pickup tine of claim 13, wherein said second hollow finger is curved.

15. The pickup tine of claim 13, wherein said second hollow finger is smaller in cross section opposite said one end.

16. The pickup tine of claim 13, wherein the shape of said second elongate hollow finger is a substantial replicate of said first finger of the harvester reel pickup tine.

17. The pickup tine of claim 13, wherein said cavity of said second hollow finger is constructed and arranged to receive a remaining broken portion of a broken first finger to repair the broken finger.

18. The pickup tine of claim 13, wherein said fastener fastens said one end of said hollow finger to the pickup tine.

19. The pickup tine of claim 13, wherein the pickup tine includes at least one wing extending from said first finger at an angle thereto, and said fastener is constructed and arranged to frictionally engage said wing to fasten said one end of said second hollow finger to said wing.

20. The pickup tine of claim 13, wherein said fastener comprises a split ring.

21. The pickup tine of claim 20, wherein said fastener comprises a pair of spaced split rings.

22. The pickup tine of claim 13, wherein the pickup tine includes at least one wing extending from said first finger at an angle thereto, and said fastener snaps onto said wing to fasten said one end of said second hollow finger to said wing.

23. The pickup tine of claim 13, wherein said fastener includes at least one wing extending from said first finger at an angle thereto; said second hollow finger is curved; said cavity of second hollow finger is constructed and arranged to receive a remaining broken portion of a broken first finger to repair the broken finger; and said fastener comprises a pair of spaced split rings which are constructed and arranged to frictionally engage said wing to fasten said one end of said second hollow finger to said wing.

24. The pickup tine of claim 13, wherein said fastener includes at least one wing extending from said first finger at an angle thereto, and said clamp, first elongate finger and wing are formed in integral one-piece relationship.

25. The pickup tine of claim 13, including in combination a harvester reel and a support shaft on said reel to which the clamp is clamped.

26. The finger of claim 13, wherein said elongate cavity is closed in the direction of its elongation and over said at least a portion of the length of said hollow finger.

27. The finger of claim 13, wherein said elongate cavity is closed at the end of said hollow finger opposite said one end.

28. A method of repairing a broken harvester reel pickup tine finger, comprising:
    positioning an elongate hollow finger having an elongate cavity therein which is curved in the direction of its elongation, said cavity opening to at least one end of said hollow finger and extending over at least a portion of the length of the hollow finger so that at least a substantial portion of a remaining portion of the broken finger extends into the cavity; and fastening said elongate hollow finger over said remaining portion of the broken finger when said portion extends into the cavity.

29. The method of claim 28, wherein the elongate hollow finger is frictionally fastened to the pickup tine.

30. The method of claim 28, wherein the elongate hollow finger is fastened to a wing of the pickup tine.

31. The method of claim 28, wherein the elongate hollow finger is snapped onto the pickup tine.

32. The method of claim 28, wherein substantially all of the remaining portion of the broken finger is positioned in the cavity.

33. The method of claim 28, wherein the repair is accomplished without removing the pickup tine from the harvester reel.

34. The method of claim 28, wherein the elongate hollow finger is frictionally fastened to the pickup tine; substantially all of the remaining portion of the broken finger is positioned in the cavity; and the repair is accomplished without removing the pickup tine from the harvester reel.

35. The method of claim 28, wherein the shape of said elongate hollow finger is a substantial replicate of the harvester reel pickup tine finger.

* * * * *